US011411527B2

(12) United States Patent
Simon

(10) Patent No.: US 11,411,527 B2
(45) Date of Patent: Aug. 9, 2022

(54) WINDOW MOUNTED SUPPORT PLATFORM FOR AN ELECTRICAL GENERATOR

(71) Applicant: Daniel Simon, Whitestone, NY (US)

(72) Inventor: Daniel Simon, Whitestone, NY (US)

(*) Notice: Subject to any disclaimer, the term of this patent is extended or adjusted under 35 U.S.C. 154(b) by 572 days.

(21) Appl. No.: 16/521,788

(22) Filed: Jul. 25, 2019

(65) Prior Publication Data

US 2020/0036323 A1 Jan. 30, 2020

Related U.S. Application Data

(60) Provisional application No. 62/703,146, filed on Jul. 25, 2018.

(51) Int. Cl.
| | |
|---|---|
| *F16M 11/00* | (2006.01) |
| *H02S 20/22* | (2014.01) |
| *F16M 7/00* | (2006.01) |
| *H02S 10/40* | (2014.01) |
| *H02S 40/38* | (2014.01) |
| *F16M 13/02* | (2006.01) |
| *E06B 5/00* | (2006.01) |

(52) U.S. Cl.
CPC ............ *H02S 20/22* (2014.12); *F16M 7/00* (2013.01); *F16M 13/02* (2013.01); *H02S 10/40* (2014.12); *H02S 40/38* (2014.12); *E06B 5/00* (2013.01)

(58) Field of Classification Search
CPC .......... H02S 20/22; H02S 10/40; H02S 40/38; F16M 7/00; F16M 13/02
See application file for complete search history.

(56) References Cited

U.S. PATENT DOCUMENTS

| 532,019 A | 1/1895 | Bourke | |
|---|---|---|---|
| 1,059,287 A | 4/1913 | Dybeck | |
| 1,198,067 A | 9/1916 | Schuttler | |
| 1,229,073 A | 6/1917 | Harris | |
| 1,721,179 A | 7/1929 | Duket | |
| 1,894,878 A * | 1/1933 | La Grange | A47L 3/02 182/152 |
| 2,092,234 A | 9/1937 | Van Wert | |
| 2,148,239 A | 2/1939 | Kumutat | |
| 2,273,370 A * | 2/1942 | Oberti | E04G 3/18 182/4 |
| 2,445,860 A | 7/1948 | Newkirk | |
| 3,010,534 A * | 11/1961 | Borke | E04G 3/18 182/58 |
| 3,061,040 A | 10/1962 | Siebert | |

(Continued)

*Primary Examiner* — Amy J. Sterling
(74) *Attorney, Agent, or Firm* — McHale & Slavin, P.A.

(57) ABSTRACT

A window mounted support platform for an electrical generator. The support platform is securable to a window frame and provides a movable platform that can be orientated on the interior side of the window frame for ease of accessing a generator secured to the platform. The movable platform can further be moved to a position external the window frame where the generator can operate without introducing fumes inside the window frame. The generator is secured to the top of the platform. The support platform employs a runner extending from a bracket configured for placement on the inside of a window frame, allowing movement of the shelf platform from an internal orientation to an external orientation. Doors are used to isolate the generator from the interior living space. An electrical cord can be routed through a sealing mechanism in the doors.

9 Claims, 4 Drawing Sheets

(56) References Cited

U.S. PATENT DOCUMENTS

| | | | | |
|---|---|---|---|---|
| 3,273,843 | A * | 9/1966 | Bell, Jr. | F24F 13/32 |
| | | | | 248/208 |
| 3,394,910 | A * | 7/1968 | Ulich | F24F 13/00 |
| | | | | 248/236 |
| 5,823,289 | A | 10/1998 | Csomos | |
| 6,731,250 | B1 * | 5/2004 | Berman | H01Q 1/1221 |
| | | | | 343/883 |
| 8,584,998 | B1 * | 11/2013 | Peterson | F24F 13/32 |
| | | | | 182/62 |
| 9,163,854 | B2 * | 10/2015 | Arbucci | E04G 3/18 |
| 9,303,895 | B1 * | 4/2016 | Grant | F24F 13/32 |
| 9,447,916 | B2 * | 9/2016 | Darby | F24F 13/32 |
| 9,605,870 | B2 * | 3/2017 | Darby | F24F 13/32 |
| 10,203,130 | B2 * | 2/2019 | Gardikis, Sr. | F24F 1/027 |
| 10,295,221 | B2 * | 5/2019 | Zhang | F16M 13/02 |
| 10,760,323 | B1 * | 9/2020 | Fong | E06B 1/363 |
| 2006/0236896 | A1 | 10/2006 | Heroux | |
| 2012/0137499 | A1 * | 6/2012 | Agnihotri | F16M 13/02 |
| | | | | 248/670 |

* cited by examiner

WINDOW MOUNTED SUPPORT PLATFORM FOR AN ELECTRICAL GENERATOR

PRIORITY CLAIM

In accordance with 37 C.F.R. 1.76, a claim of priority is included in an Application Data Sheet filed concurrently herewith. Accordingly, the present application claims priority to U.S. Provisional Patent Application No. 62/703,146, entitled "Window Mounted Support Platform for an Electrical Generator" filed Jul. 25, 2018. The contents of the above referenced application is incorporated herein by reference.

FIELD OF THE INVENTION

The invention is directed to the field of support platforms and, in particular, to a window mounted support platform for support of a portable generator.

BACKGROUND OF THE INVENTION

Portable generators are used to provide temporary electrical power. Such generators have been found particularly useful during a power failure. A power failure occurs when a short circuit, electric transmission line, substation, or another part of an electrical distribution system is interrupted. This can be the result of a circuit overload due to heat, a downed distribution system, or the like power interruptions.

In many instances, power failures can be anticipated. Bad weather that results in hurricanes or high winds are naturally occurring conditions that can result in widespread power failures. For example, high winds associated with a hurricane can knock down power lines and cause transformer ground interrupts, lightning can overload an electrical circuit, flooding can ground out substations, and so forth. Power failures can also occur when the weather is calm, such as when a large electrical load is caused by non-stop air conditioner operation. Unfortunately, power interruption can result in much more than inconvenience.

A portable generator consists of an internal combustion engine motor coupled to an electrical motor constructed and arranged to produce 240/120 volts at 60 Hz with a current dependent upon the size of the engine. A 15 KW generator may produce 60 amps of current, but use upwards of one gallon of fuel per hour, making it difficult to sustain. A 2 KW generator may produce 15 amps of current and use less than one tenth of a gallon of fuel per hour. For purposes of this invention, the portable generators utilized are small, lightweight, and likely to produce less than 2 KW.

Despite the small size, such a generator can be a life saver for an elderly person who may not be able to handle high temperatures or loss of refrigeration, who may require oxygen, and so forth. For instance, a small generator may make the power failure tolerable if a refrigerator can be operated, together with a light and fan or small air conditioner. A family with a house full of children would have a large problem if they lost a refrigerator full of food, resulting in a major inconvenience in feeding the family and expense to replace the food. Further, if the power interruption lasts for any period of time, trying to keep fresh food for the family can be more than just problematic. The public is dependent upon electrical power to power cellular telephones for communication, televisions for information, and so forth. Loss of electricity for a long period of time is not only disruptive, it can be life threatening.

Owners of or residents of single family homes, with land around the home, can prepare for a power failure by maintaining a generator. The generator must be operated outdoors since the engine produces a toxic exhaust. In such instances, the occupant of the home may place the generator outside a window or door and run an electrical cord through the door or window to operate the electrical features. Unfortunately, a portable generator can be easily stolen. The portable nature of the generator and unobserved placement outside a home makes it easy to remove.

The occupant of an apartment building or multi-story condominium does not have land around the building that would accept the placement of an electric generator. Upon the loss of electricity, the lack of air conditioning in a multi-story building can quickly lead to hot and high humidity conditions. Mold spores thrive in hot and humid conditions, leading to unsafe living areas. Frozen goods can defrost, leading to spoilage. In such instances, the occupants can quickly find themselves in a compromising position, as the living conditions in the interior space of the building can quickly deteriorate.

Thus, what is needed in the art is a device that allows placement of a generator in a multi-story apartment or condominium building to allow occupants to receive the benefits of a generator.

PRIOR ART

U.S. Pat. No. 2,092,234 discloses a window shelf device for extending the width of a window stool in the same plane, with the upper surface of the window stool comprising a shelf member, a brace secured on the shelf member, U-shaped clamps recessed into an edge of said shelf member and secured to the shelf member, said clamps extending over and under the window stool, a screw in each of said brackets engaging the lower forward edge of said stool for attaching said shelf member to the window stool with the edge of said shelf member engaged against the edge of said window stool and with the upper surface of the shelf member in the same plane with the window stool, said brace extending from the forward edge of the shelf member to the apron of the window stool.

U.S. Pat. No. 532,019 discloses a window sill platform to enable a person to take position outside the building for the washing of windows, painting, repairs, and so forth.

U.S. Pat. No. 1,059,287 discloses a temporary scaffold to permit access to the outside of a window or any purpose such as cleaning, glazing, painting.

U.S. Pat. No. 1,198,067 discloses an adjustable window platform to gain access to the exterior of a window.

U.S. Pat. No. 1,229,073 discloses a telescoping window platform. The telescoping aspect of the disclosure is based upon an expandable tube and sleeve wherein the platform can be moved from a first position to a second position. This reference is important to review as it moves the platform outside the window.

U.S. Pat. No. 6,731,250 discloses a longitudinal housing that encloses multiple telescoping side rails for extending a top support plate outwardly from the housing to a position outside an open window. An upper surface of the top support plate is attached to a satellite TV dish base plate It is noted that the satellite dish is shown in hidden lines which designates the patent disclosure can be used for items other than a TV dish.

U.S. Pat. No. 9,163,854 discloses a bracket for mounting an air conditioning unit in a window. In this disclosure a base plate has a front edge and a rear edge and a pair of support legs connected to the base plate.

U.S. Pat. No. 2,148,239 discloses a window platform that is removably engageable with the sills of windows when the sash is raised.

U.S. Pat. No. 1,721,179 discloses a platform that may be securely connected to the window sill and which will project outward from the building to enable anyone to sit or stand on the platform.

U.S. Pat. No. 2,445,860 discloses a demountable staging which may be readily assembled and adjusted to windows of various widths.

U.S. Pat. No. 3,061,040 discloses a window platform which will readily support a person on the exterior of a window which may be quickly and easily inserted and removed from such window frame.

U.S. Pat. No. 5,823,289 discloses a window mounted temporary working platform which is assembled from inside the window being repaired, maintained, or washed. The device provides a working platform at an elevation below the outer window sill with two side rails, an outer rail and a working platform which is supported without permanent installation on the building being serviced.

U.S. Patent Application Publication No. 2006/0236896 discloses an adjustable window shelf that is removably attachable to a window sill or other structure as a support for potted plants, a pet perch, or the like. A shelf platform has at least one anchor adjustably extendable from a rear of the platform.

SUMMARY OF THE INVENTION

Disclosed is a window mounted support platform for an electrical generator, as well as a generator powered by a lithium-based battery. The window mounted support platform allows a small generator to be temporarily mounted outside of a multi-story building. The external placement allows a condo or apartment dweller to have the benefits of portable power by positioning of the generator outside the building, but in a location close enough to service. The support platform is securable to a window frame, and provides a movable platform that can be orientated on the interior side of the window frame for ease of accessing a generator secured to the platform. The movable platform can further be moved to a position external the window frame where the generator can operate without introducing fumes inside the window frame. The generator is secured to a top of the platform by straps, cables or the like fasteners. In the preferred embodiment, the generator is operated using a propane canister to allow ease of refueling the generator. In an alternative embodiment, the generator employs a removable fuel tank, allowing refilling of the fuel tank external a dwelling area.

The support platform employs a runner extending from a bracket configured for placement on the inside of a window frame, allowing movement of the shelf platform from an internal orientation to an external orientation, wherein the shelf platform is substantially outside the window frame. With the shelf platform inside the window frame, the operator can easily mount the generator as well as service the generator. The generator is a small Honda®, or the like, known for their quiet operation and minimal fuel consumption. In the preferred embodiment, the generator is fueled by a propane canister, wherein the operator can install a fuel tank without the need for liquid fuel. Once the fuel tank is attached, the generator can be started and the shelf platform moved to a position external the window frame. In another embodiment, a liquid fuel tank can be removably attached to the generator assembly. In this embodiment the liquid fuel tank can be detached from the generator assembly and filled in an area outside the living space. Once filled the liquid fuel tank can be reattached to the generator assembly for positioning outside the window frame. Once the generator assembly is placed outside the window frame, flexible doors can be used to isolate the generator from the interior living space. An electrical cord can be routed through the flexible doors, sealing the generator from the interior space.

In an alternate embodiment, a lithium battery may be used to power the generator. However, as is known, a lithium battery can be hazardous inside living spaces. Thus, in this embodiment, which is located outside of the window frame, the lithium battery would be isolated from the interior living space.

A primary objective of the invention is to provide a window mounted support platform for an electrical generator.

Still another objective of the invention is to provide a support platform that is movable, allowing a generator to be serviced indoors when not operating, and moved to a position external the window frame when operating.

Still another objective of the invention is to provide movable doors for sealing the window frame while the generator is orientated external the window frame.

Yet still another objective of the invention is to provide a window mounted generator that eliminates the need for long electrical cords for transporting electrical power from a ground positioned generator to a dwelling remote from the generator.

Another objective of the invention is to provide a window mounted platform that is less susceptible to theft as the generator is considered to be in a location not easily viewable by the operator.

Other objectives and advantages of this invention will become apparent from the following description taken in conjunction with any accompanying drawings wherein are set forth, by way of illustration and example, certain embodiments of this invention. Any drawings contained herein constitute a part of this specification, include exemplary embodiments of the present invention, and illustrate various objects and features thereof.

DETAILED DESCRIPTION OF THE PREFERRED EMBODIMENT

Figure 5:
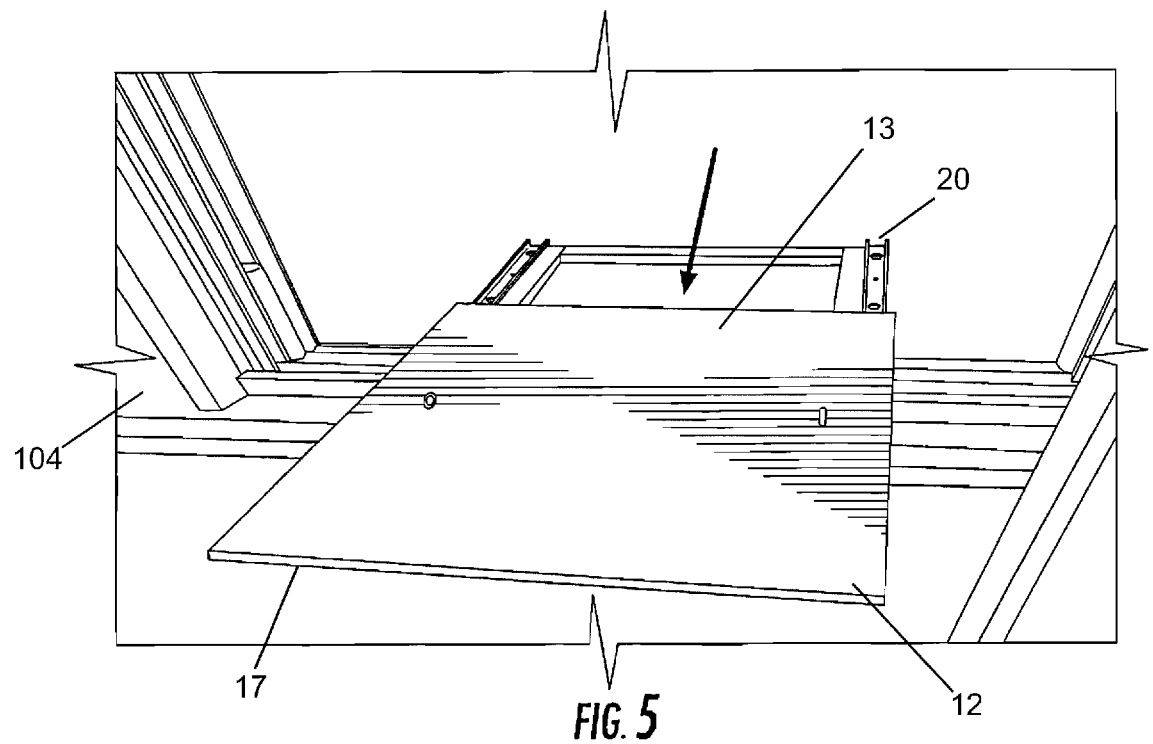
FIG. 5 is a pictorial front view of the window mounted support platform orientated interior to a window frame.
Figure 6:
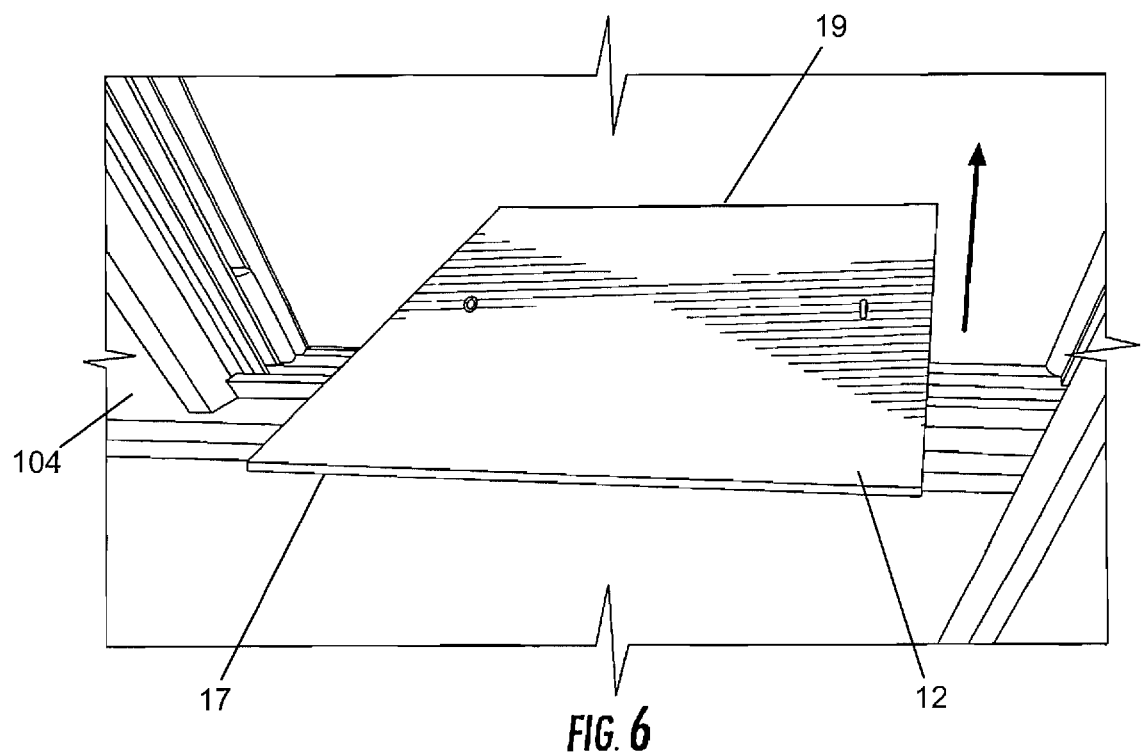
FIG. 6 is a pictorial front view of the window mounted support platform orientated exterior to a window frame.

Referring to the Figures, disclosed is the window mounted support system 10 for an electrical generator 100. The window mounted support system consists of a platform 12, which is formed from a substantially rectangular plate having an upper surface 13 and a lower surface 15, front edge 17, rear edge 19, and side edges 21 and 23. Runner tracks 14 and 18 extend from the front edge 17 to the rear edge 19, and are secured to the lower surface 15 of the platform 12. An L-shaped bracket 16 positioned along the front edge 17 of the platform 12 is configured for positioning on the inside 102 of a window frame 104. The runner track 18 is secured to channel 25, allowing the slidable movement of the platform 12 from an internal orientation, as depicted in FIG. 5, wherein the platform 12 is substantially inside the window frame 104, to an external orientation, as depicted by FIG. 6, wherein the platform 12 is substantially outside the window frame 104.

The channel 25 is attached to the runner track 18, along a bottom surface 15 of the support platform 12. The runner 18 fits within the channel 25 and can either include a track made out of rotatable bearings, or use a plastic material which allows slidable movement. It is noted that runner assembly 14 is coupled to a channel, not shown, which is the same as and placed parallel to channel 25.

The platform 12 is further attached to the exterior of a building 108 by support brackets 30 and 32. In particular, support bracket 30 engages a C-track 34, having a plurality of alignment apertures 36 for receipt of a locking pin 38 that engages one of the apertures 36 along an upper end 40 of the bracket. The bracket 30 is slid along the C-track 34, so as to position the platform 12 in a horizontal plane for engagement of the pin 38 within aperture 36 for securing the bracket 30 in position. Similarly, bracket 32 is attached to C-track 42, providing a uniform support to the support platform 12 in the same manner as bracket 30. Between the inner L-shaped bracket 16 and support brackets 30 and 32, the platform is secured to the window frame 104 and capable of holding up to 45 lbs.

Figure 1:
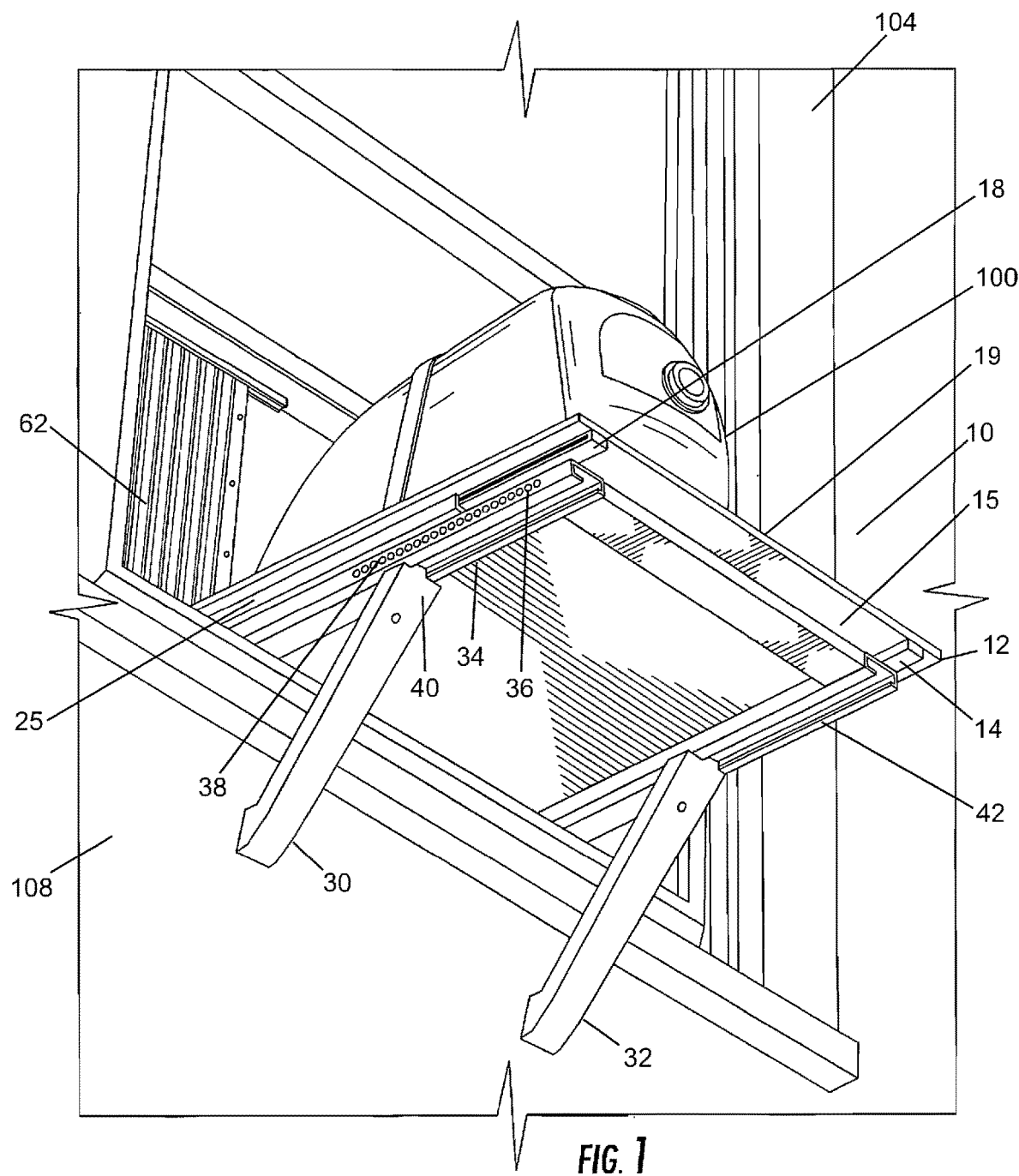
FIG. 1 is a pictorial perspective view of the window mounted support platform and a generator.
Figure 2:
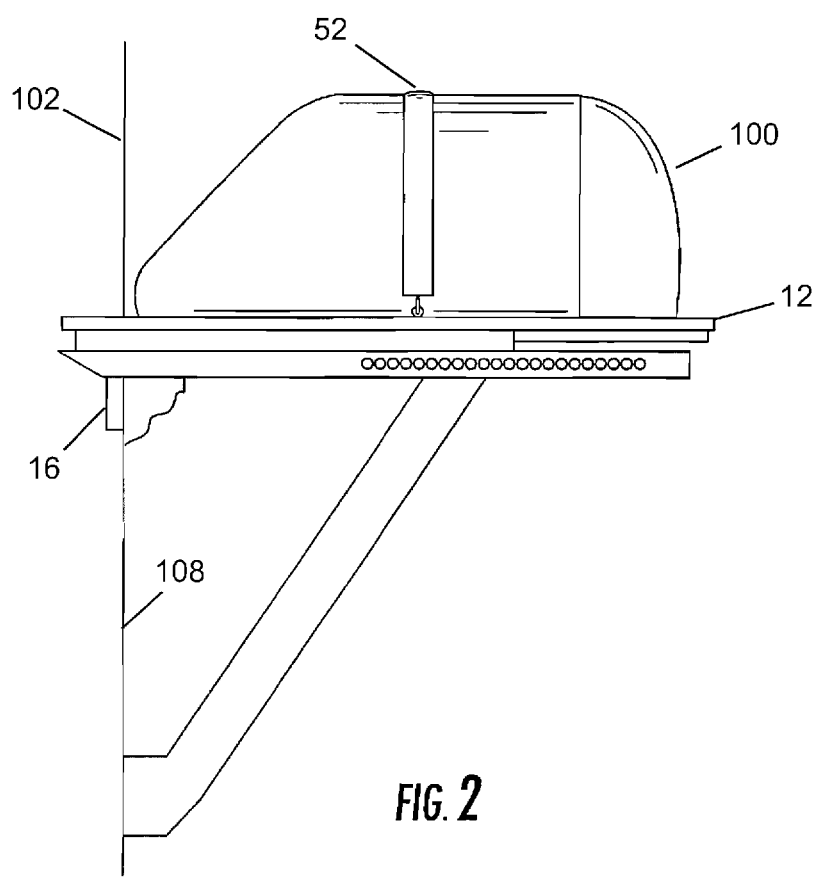
FIG. 2 is a pictorial side view of the window mounted support platform and generator orientated exterior to a window frame.
Figure 3:
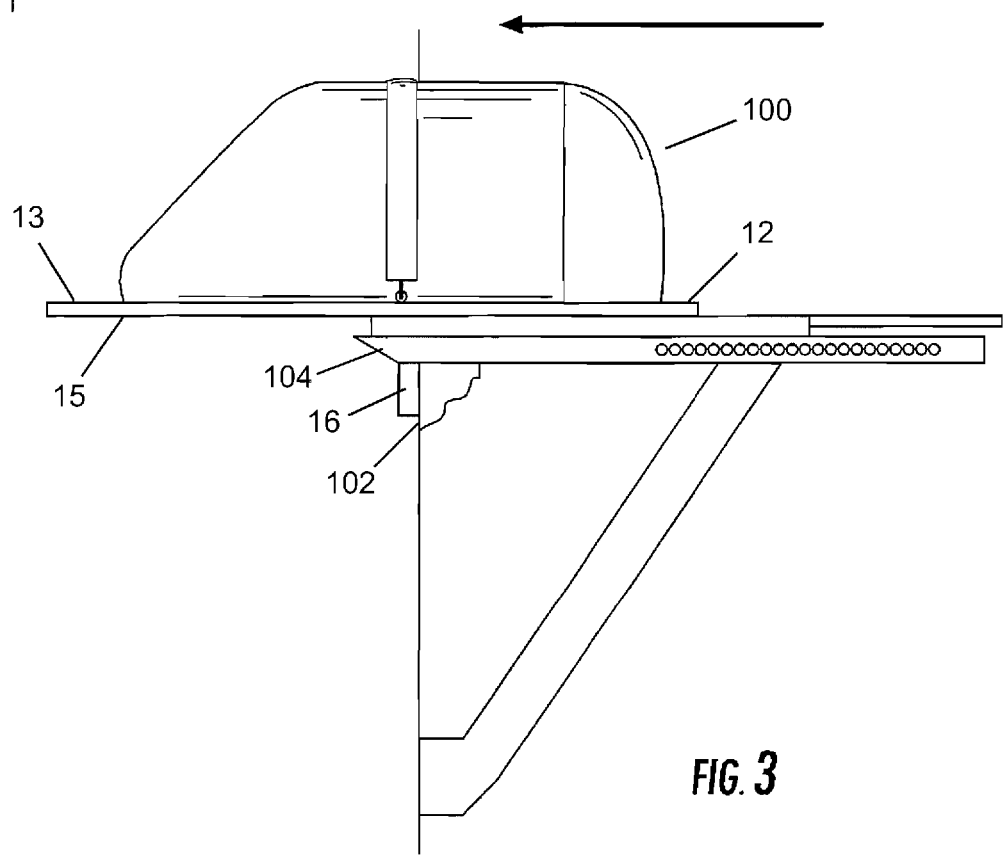
FIG. 3 is a pictorial side view of the window mounted support platform and generator orientated partially in the interior to a window frame.
Figure 4:
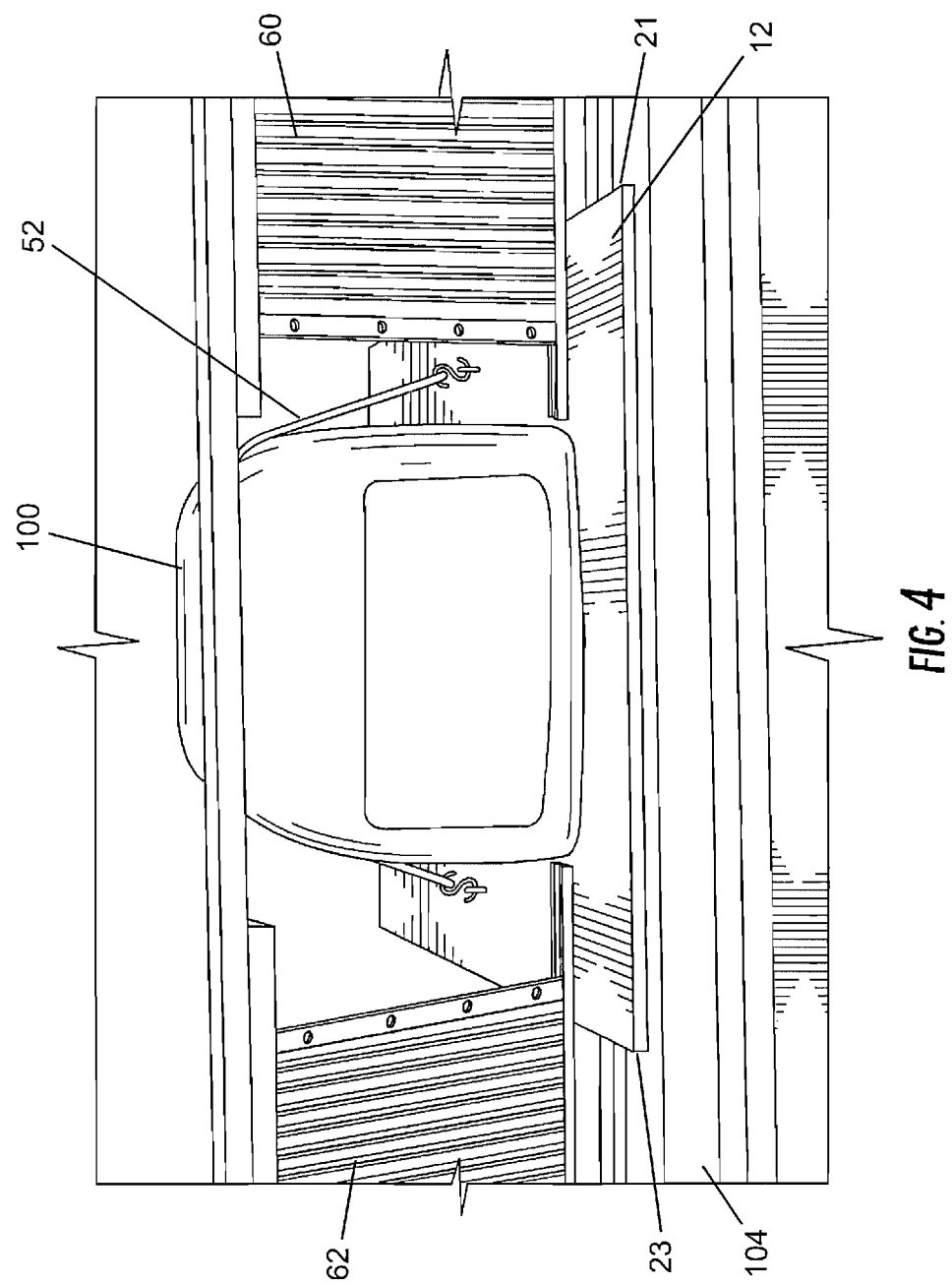
FIG. 4 is a pictorial front view of the window mounted support platform and generator.

A generator is placed on the upper surface 13 of the support platform 12. The generator 100 is secured to the upper surface 13 of support platform 12 by the use of a strap 52. The strap 52 can be a bungee cord, nylon strap, metal band, or most any fixation fastener allowing the generator to be secured in a stationary position to prevent movement of the generator while operating. As depicted in FIG. 3, the generator 100 can be slid into the interior 102 of the window frame 104, wherein the generator can be fueled, maintained, or even started before being placed on the exterior of the dwelling. The generator may have a removable tank, such as a propane canister, or the entire generator can be removed from the platform 12 and taken outside to be filled with fuel. In a preferred embodiment, a Honda® or the like generator, holding less than 0.6 gallons of fuel, is preferable. In the preferred embodiment, a propane canister is attached to the generator for operation of the internal combustion engine. When the generator 100 is placed along the interior of the dwelling, the operator can easily start the generator and then slide the support platform 12 to the exterior 108 of the building, as depicted in FIG. 2, to assure all exhaust from the internal combustion engine is expelled to the exterior of the building. As depicted in FIG. 4, sliding doors 60 and 62 are used to seal off the window. Doors 60 and 62 can be secured together, providing a seal for the window frame. An extension cord, not shown, can be drawn through the doors 60 and 62, available for the occupant to secure an appliance or other item to be powered by the temporary operation of the portable generator 100.

A preferred generator is 1 KW, which provides about 900 W (7.5 A) 120 volts at 60 Hz. Honda® Generators has a compact unit with a 0.6 gallon fuel capacity with a run time of 8.3 hours using a ¼ load, or 3.5 hours under full loading. Such a unit operates at less than 60 decibels. By comparison, 60-70 decibels is the sound of a normal conversation at about a 3 feet distance. In this embodiment a liquid fuel tank is removably attached to the generator assembly. The liquid fuel tank temporarily hooked to the generator assembly and a quick disconnect is utilized to separate a fuel line between the fuel tank and the generator assembly. The fuel tank is then unhooked from the generator assembly wherein the fuel tank and refilled in an area outside the living space. Once refilled the liquid fuel tank is reattached to the generator assembly before positioning outside the generator assembly outside the window frame. Once the generator assembly is placed outside the window frame, flexible doors can be used to isolate the generator from the interior living space. The engine is operated from the group consisting of gasoline, diesel, vegetable fuel, or propane. Alternatively a lithium battery powered generator coupled to a solar panel may be placed on the window mounted support platform. While a battery powered generator does not need surface for fuel, a benefit of the movable support platform allows for ease of solar panel adjustment and servicing.

It is to be understood that while a certain form of the invention is illustrated, it is not to be limited to the specific form or arrangement herein described and shown. It will be apparent to those skilled in the art that various changes may be made without departing from the scope of the invention, and that the invention is not to be considered limited to what is shown and described in the specification and any drawings/figures included herein.

One skilled in the art will readily appreciate that the present invention is well adapted to carry out the objectives and obtain the ends and advantages mentioned, as well as those inherent therein. The embodiments, methods, procedures and techniques described herein are presently representative of the preferred embodiments, are intended to be exemplary, and are not intended as limitations on the scope. Changes therein and other uses will occur to those skilled in the art which are encompassed within the spirit of the invention and are defined by the scope of the appended claims. Although the invention has been described in connection with specific preferred embodiments, it should be understood that the invention as claimed should not be unduly limited to such specific embodiments. Indeed, various modifications of the described modes for carrying out the invention which are obvious to those skilled in the art are intended to be within the scope of the following claims.

What I claim is:

1. A window mounted support for a portable generator assembly, comprising:
   a platform having a substantially rectangular shape with a front edge, a rear edge, a first and second side edge, a top surface and a bottom surface;
   a first runner track attached to said bottom surface of said platform extending from said front edge to said rear edge adjacent to said first side edge, said first runner track sidably insertable within a first channel mounted to a first C-track;
   a second runner track attached to said bottom surface of said platform extending from said front edge to said rear edge adjacent to said second side edge, said second runner track sidably insertable within a second channel mounted to a second C-track;
   a first support bracket having a first end securable to said first C-track and a second end positionable against a outer wall beneath the window frame, said first support bracket adjustable to maintain said first C-track in a substantially horizontal position with a bottom of the window frame;

a second support bracket having a first end securable to said second C-track and a second end positionable against a wall beneath the window frame adjacent said first support bracket, said second support bracket adjustable to maintain said second C-track in a substantially horizontal position with the bottom of the window frame; and an L-shaped bracket secured to a support bracket secured to a front edge bottom surface of said platform, said L-shaped bracket positionable against an inner wall beneath said window frame;

wherein a portable generator assembly is mounted on said top surface of said platform, and said platform is movable along said first and second runner track between an internal for servicing and external position.

2. The window mounted support platform for said portable generator assembly according to claim 1 including flexible door panels that open to allow said platform to move internal for servicing and close to seal the opening in the window frame when said platform is positioned external.

3. The window mounted support platform for said portable generator assembly according to claim 1 including a sealable opening constructed and arranged to house a power cord.

4. The window mounted support platform for said portable generator assembly according to claim 1 wherein including a bracket for holding a generator to said platform.

5. The window mounted support platform for said portable generator assembly according to claim 4 wherein said generator is an internal combustion engine coupled to an electrical generator capable of producing about 1 KW at about 900 W and 120 volts.

6. The window mounted support platform according to claim 5 wherein said engine includes a removable propane fuel tank.

7. The window mounted support platform according to claim 5 wherein said engine is operated from the group consisting of gasoline, diesel, vegetable fuel, or propane.

8. The window mounted support platform for said portable generator assembly according to claim 4 wherein said generator is a lithium battery powered electrical generator coupled to a solar panel.

9. The window mounted support platform for said portable generator assembly according to claim 1 wherein each said C-track includes a plurality of apertures for receipt of a pin associated with each said support bracket, said pin releasably engaging said C-track to maintain the support bracket in a selected position.

* * * * *